United States Patent [19]
Takimoto et al.

[11] Patent Number: 5,609,673
[45] Date of Patent: Mar. 11, 1997

[54] RECORDING LIQUID

[75] Inventors: Hiroshi Takimoto; Hideo Sano; Masahiro Yamada, all of Kanagawa, Japan

[73] Assignee: Mitsubishi Chemical Corporation, Tokyo, Japan

[21] Appl. No.: 571,179

[22] Filed: Dec. 12, 1995

[30] Foreign Application Priority Data

Dec. 12, 1994 [JP] Japan ................................. 6-307708
May 18, 1995 [JP] Japan ................................. 7-120060

[51] Int. Cl.⁶ .................................................. C09D 11/02
[52] U.S. Cl. .................................. 106/22 K; 534/797
[58] Field of Search .......................... 106/22 K; 534/797

[56] References Cited

U.S. PATENT DOCUMENTS

| | | | |
|---|---|---|---|
| 4,734,190 | 4/1988 | Shimada et al. | 106/22 K |
| 4,908,062 | 3/1990 | Balmforth et al. | 106/22 K |
| 5,262,527 | 11/1993 | Gregory et al. | 534/797 |
| 5,383,960 | 1/1995 | Gregory et al. | 106/22 K |
| 5,473,053 | 12/1995 | Kenyon et al. | 106/22 K |
| 5,519,121 | 5/1996 | Renner et al. | 106/22 K |

FOREIGN PATENT DOCUMENTS

| | | | |
|---|---|---|---|
| 0468647 | 1/1992 | European Pat. Off. | |
| 4-279671 | 10/1992 | Japan | C09B 33/10 |
| 9416021 | 7/1994 | WIPO | |

*Primary Examiner*—Helene Klemanski
*Attorney, Agent, or Firm*—Sughrue, Mion, Zinn, Macpeak & Seas

[57] ABSTRACT

A recording liquid comprising an aqueous medium and at least one dye selected from dyes, the free acid forms of which are represented by formula (I):

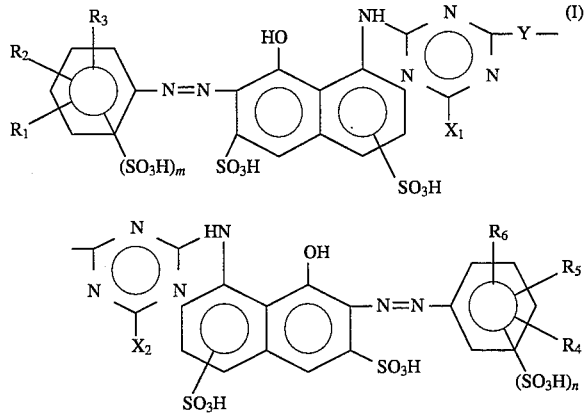

All the symbols in formula (I) are defined in the description.

12 Claims, No Drawings

RECORDING LIQUID

FIELD OF THE INVENTION

The present invention relates to a recording liquid. More particularly, the present invention relates to a recording liquid suitable for ink-jet recording.

BACKGROUND OF THE INVENTION

The ink-jet recording method has come into practical use in which droplets of a recording liquid containing a water-soluble dye, e.g., a direct dye or an acid dye, are issued from a minute ejection orifice to conduct recording.

With respect to the recording liquid, it is required not only to rapidly fix to recording paper for general business use, e.g., paper for electrophotography or other PPCs (plain-paper copiers) and fanfold paper (continuous paper for computers, etc.), to give a print in which the printed characters are of good quality, that is, the printed characters (image) are free of blurring and have clear outlines, but also to have excellent storage stability. Therefore, usable solvents for the recording liquid are severely restricted.

With respect to dyes for the recording liquid, they are required, for example, not only to have sufficient solubility in the restricted solvents as described above and be stable even in long-term storage of the recording liquid, but also to give printed images having a high density and excellent water and light resistance. However, it has been difficult to satisfy these many requirements simultaneously.

Although various techniques (as described, e.g., in JP-A-61-101574 (the term "JP-A" as used herein means an "unexamined published Japanese patent application"), JP-A-61-101576, JP-A-61-195176, JP-A-61-62562, JP-A-61-247771, JP-A-62-156168, JP-A-62-246974, JP-A-63-63765, JP-A-63-295685, JP-A-1-123866, JP-A-1-240584, JP-A-2-16171, JP-A-3-122171, JP-A-3-203970, and JP-A-4-153272) have hence been proposed, all these prior art techniques have failed to sufficiently meet the requirements of the market.

In JP-A-4-279671 (U.S. Pat. No. 5,262,527) and PCT International Publication WO 94/16021, dyes usable in ink-jet recording are disclosed which have a structure comprising two molecules of a triazinyl-containing monoazo dye which are bonded together through a divalent organic connecting group; such a structure is similar to the structure of the dye for use in the present invention described hereinafter.

However, in the former reference (JP-A-4-279671), there is a description to the effect that the divalent organic connecting groups are not important. The examples of the connecting group which are given therein include a (substituted) phenylenediamine group, and differ from the connecting group in the present invention. The dye having the connecting group whose structure is planar lacks in insufficient coloring property, so that resulted images become to have insufficient color densities.

These groups also have a drawback that-since they are conjugated groups, the dyes containing these groups have a deep and strongly bluish color tone. Further, there is a description therein to the effect that the triazinyl-bonded group (represented by Z in the reference, which corresponds to $X_1$ or $X_2$ in the present invention) is preferably a group bonded to the triazinyl group through a nitrogen atom, e.g., $NHC_2H_4OH$ or morpholino, and the structures of the dyes used in the Examples given in that reference are limited to those having the group. However, such a dye gives images with reduced chroma.

The divalent organic connecting group used in the latter reference (WO 94/16021) is a group derived from either a (substituted) phenylenediamine group or a substituted piperazine group and is hence different from the connecting groups in the present invention. However, the divalent organic connecting group derived from a (substituted) phenylenediamine is undesirable as described above, while use of the divalent organic connecting group derived from a substituted piperazine results in the dyes of insufficient resistance to light and water.

SUMMARY OF THE INVENTION

An object of the present invention is to provide a magenta recording liquid which is satisfactory in print quality when used in ink-jet recording, writing utensils, etc. to conduct recording on plain paper, gives recorded images having high density and excellent in light resistance and especially in water resistance and color tone, and has satisfactory stability in long-term storage.

In particular, the magenta dyes conventionally used in recording liquids have a drawback that the commercial dyes which have satisfactory water resistance and a high affinity for cellulose or paper as the main receiving material, i.e., direct dyes (e.g., sulfur dyes and azoic dyes), have an indistinct color tone, while the acid dyes which have a distinct color tone have poor water resistance. Thus, there has been a desire for development of a magenta dye which has both a satisfactory color tone and high water resistance.

Other objects and effects of the present invention will be apparent from the following description.

The present inventors have found that a recording liquid containing a specific dye satisfies, in particular, the requirements concerning color tone and water resistance to attain the objects described above. The present invention has been achieved based on this finding.

The present invention relates to a recording liquid comprising an aqueous medium and at least one dye selected from dyes, the free acid forms of which are represented by formula (I):

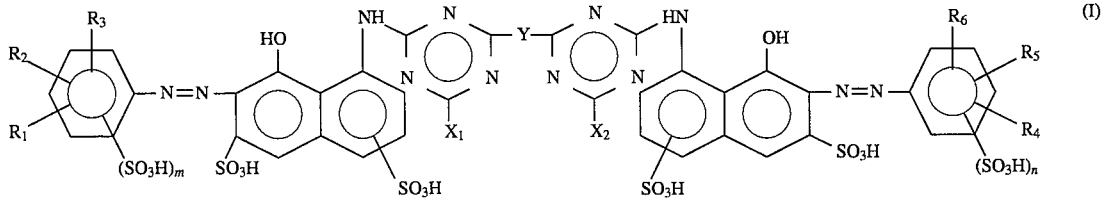

wherein R, $R_2$, $R_3$, $R_4$, $R_5$, and $R_6$ each independently represents a substituted or unsubstituted alkyl group having 1 to 9 carbon atoms, an alkoxy group having 1 to 9 carbon atoms, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic ester group, a sulfonyl group, a carboxyl group, or a carboxylic ester group;

m and n each independently represents a number of 0, 1, or 2;

$X_1$ and $X_2$ each independently represents a group represented by $-OR_7$;

$R_7$ represents a hydrogen atom, an alkyl group having 1 to 8 carbon atoms, an alkenyl group having 2 or 3 carbon atoms, an aryl group, an aralkyl group, a cyclohexyl group, or a nitrogenous heterocyclic group, these groups each optionally having a substituent; and Y represents a divalent connecting group represented by any one of formulae (II) to (V):

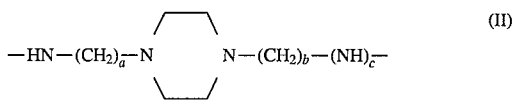

wherein a and b each represents a number of 0 to 6 and c represents a number of 0 or 1,

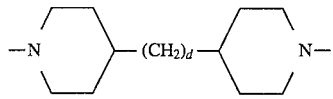

wherein d represents a number of 1 to 6,

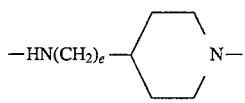

wherein e represents a number of 1 to 6,

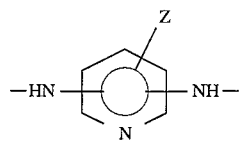

wherein Z represents a hydrogen atom or an alkyl group having 1 to 4 carbon atoms.

The present invention also relates to an ink-jet recording method comprising the step of adhering droplets of the recording liquid of the present invention, which are issued from a minute ejection orifice, to a receiving material.

DETAILED DESCRIPTION OF THE INVENTION

The dye for use in the present invention is a dye, the free acid form of which is represented by formula (I) described above, which is sometimes simply referred to as "dye represented by formula (I)".

Specifically, examples of $R_1$, $R_2$, $R_3$, $R_4$, $R_{5, \text{ and } R6}$, which each independently represents a substituent in formula (I), include substituted or unsubstituted alkyl groups having 1 to 9 carbon atoms (e.g., methyl, ethyl, n-propyl, isopropyl, n-butyl, trifluoromethyl, and dimethylaminomethyl), alkoxy groups having 1 to 9 carbon atoms (e.g., methoxy, isopropoxy, and n-butoxy), halogen atoms (e.g., fluorine, chlorine, and bromine), a hydrogen atom, a hydroxyl group, substituted or unsubstituted carbamoyl groups (e.g., carbamoyl, N,N-dimethylcarbamoyl, and phenylcarbamoyl), substituted or unsubstituted sulfamoyl groups (e.g., sulfamoyl, N-methylsulfamoyl, N-ethylsulfamoyl, N-ethyl-N-phenylsulfamoyl, N,N-dimethylsulfamoyl, and p-carboxyphenylsulfamoyl), substituted or unsubstituted amino groups (e.g., N-methylamino, carbamoylamino, N,N-diethylamino, acetylamino, and N-methyl-N-acetylamino), a nitro group, sulfonic ester groups (e.g., phenoxysulfonyl), sulfonyl groups (e.g., hydroxyethylsulfonyl and benzylsulfonyl), and carboxylic ester groups (e.g., methoxycarbonyl).

Symbols m and n each represents 0, 1, or 2. $X_1$ and $X_2$ each independently represents a group represented by $-OR_7$. Examples of substituent $R_7$ include a hydrogen atom, substituted or unsubstituted alkyl groups having 1 to 8 carbon atoms (e.g., methyl, ethyl, n-butyl, n-octyl, ethylhexyl, isopropyl, and t-butyl), substituted or unsubstituted alkenyl groups having 2 or 3 carbon atoms (e.g., vinyl and allyl), aryl groups (e.g., phenyl, 4-nitrophenyl, 4-butylphenyl, and 4-carboxyphenyl), aralkyl groups (e.g., benzyl and phenethyl), a cyclohexyl group, and nitrogenous heterocyclic groups (e.g., pyridyl).

Y represents a divalent connecting group represented by any one of formulae (II) to (V):

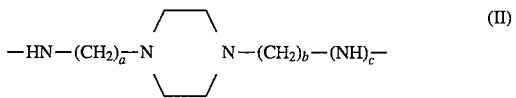

wherein a and b each represents a number of 0 to 6 and c represents a number of 0 or 1,

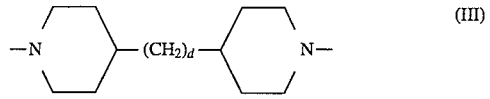

wherein d represents a number of 1 to 6,

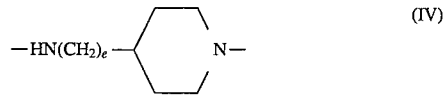

wherein e represents a number of 1 to 6,

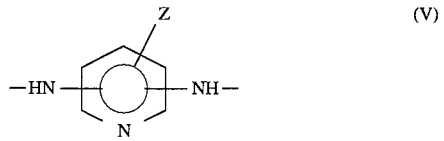

wherein Z represents a hydrogen atom or an alkyl group having 1 to 4 carbon atoms.

The dye for use in the present invention preferably has a structure represented by formula (I) wherein the number of carboxyl groups is not more than 3, generally from the standpoint of water resistance.

In the present invention, m and n each is preferably 0 or 1.

In the case where m and n each is 0 or 1, it is preferred that at least one of $R_1$, $R_2$, and $R_3$ and at least one of $R_4$, $R_{5,}$ $_{and}$ $R_6$ are not a hydrogen atom.

When m and n in formula (I) each is 1, the dye preferably has a structure in which each $SO_3H$ group is bonded to the phenyl group at the ortho position with respect to the azo group.

When m and n in formula (I) each is 0, the dye preferably has a structure in which at least one of $R_1$ to $R_3$ and at least one of $R_4$ to $R_6$ each is a hydrogen atom, least one of $R_1$ to $R_3$ and at least one of $R_4$ to $R_6$ each is a group selected from a trifluoromethyl group, a substituted or unsubstituted sulfamoyl group, a group derived from a lower alkyl ester (a lower alkyl hereinafter means a $C_{1-4}$ alkyl) of a sulfonic acid, a group derived from a $C_{6-12}$ aryl ester of a sulfonic acid, a COOH group, and a group derived from a lower alkyl ester of a carboxylic acid, each of these groups being bonded to the phenyl group at the ortho position with respect to the azo group.

The dye preferably has a structure represented by formula (I) wherein the moieties

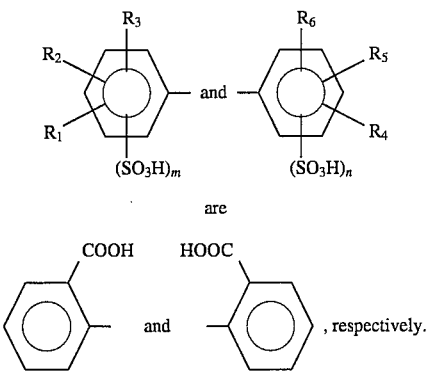

are

COOH and HOOC , respectively.

Further, the dye preferably has a structure represented by formula (I) wherein $X_1$ and $X_2$ each represents an OH group, and the moieties

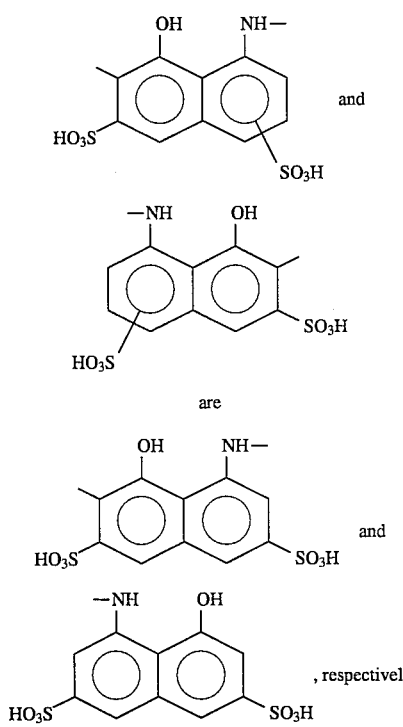

are

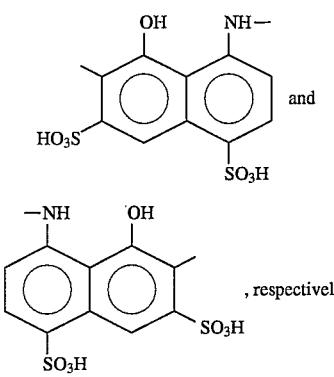

, respectively,

Especially preferred of the dyes represented by formula (I) are dyes, the free acid forms of which are symmetrical about the connecting group Y, which are represented by formula (VI):

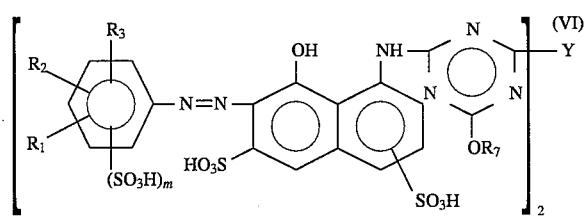

wherein $R_1$, $R_2$, $R_3$, $R_7$, m, and Y have the same meanings as in formula (I). The dyes represented by formula (VI) are preferred from the standpoint of color tone, water resistance, and suitability for practical use.

The dyes represented by formula (I) for use in the present invention may be used either in the free acid form (the structure represented by formula (I)) or in the form of a salt. Also usable is a dye in which part of the free acid groups is in a salt form. Furthermore, a combination of a salt-form dye and a dye in a free acid form may be used. Examples of dyes in such salt forms include in alkali metal salts form, e.g., Na, Li, and K, salts, in ammonium salts form wherein some of hydrogen atoms in ammonium group may optionally be substituted with an alkyl or hydroxyalkyl group, and in organic amine salts form. Examples of the organic amines include lower alkylamines, hydroxy-substituted lower alkylamines, carboxy-substituted lower alkylamines, and polyamines having 2 to 10 alkyleneimine units each having 2 to 4 carbon atoms. In the case of these salt-form structures, two or more kinds of such salt groups may be present in the same molecule.

Specific examples of these dyes include dyes Nos. (1) to (24) shown below.

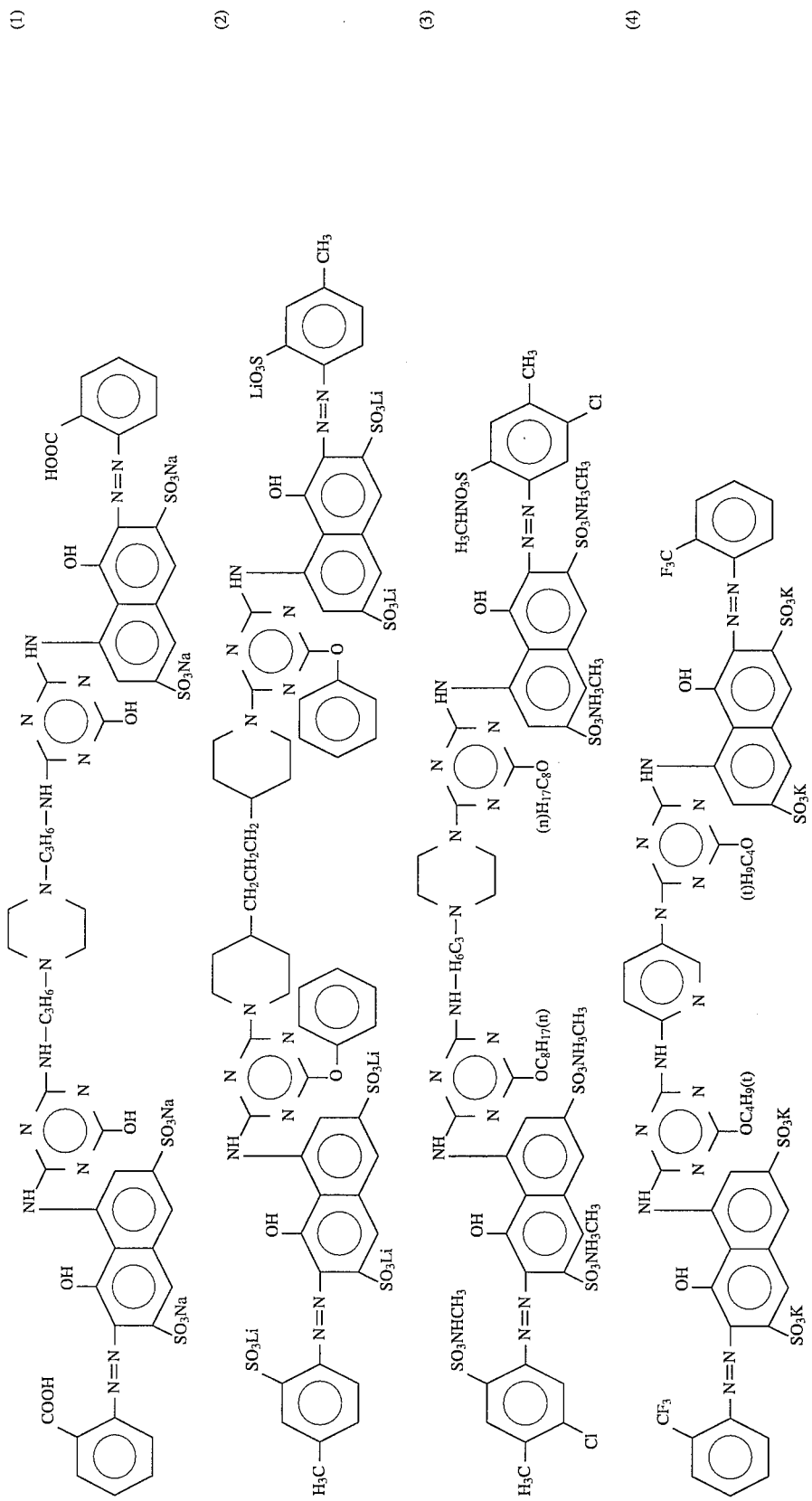

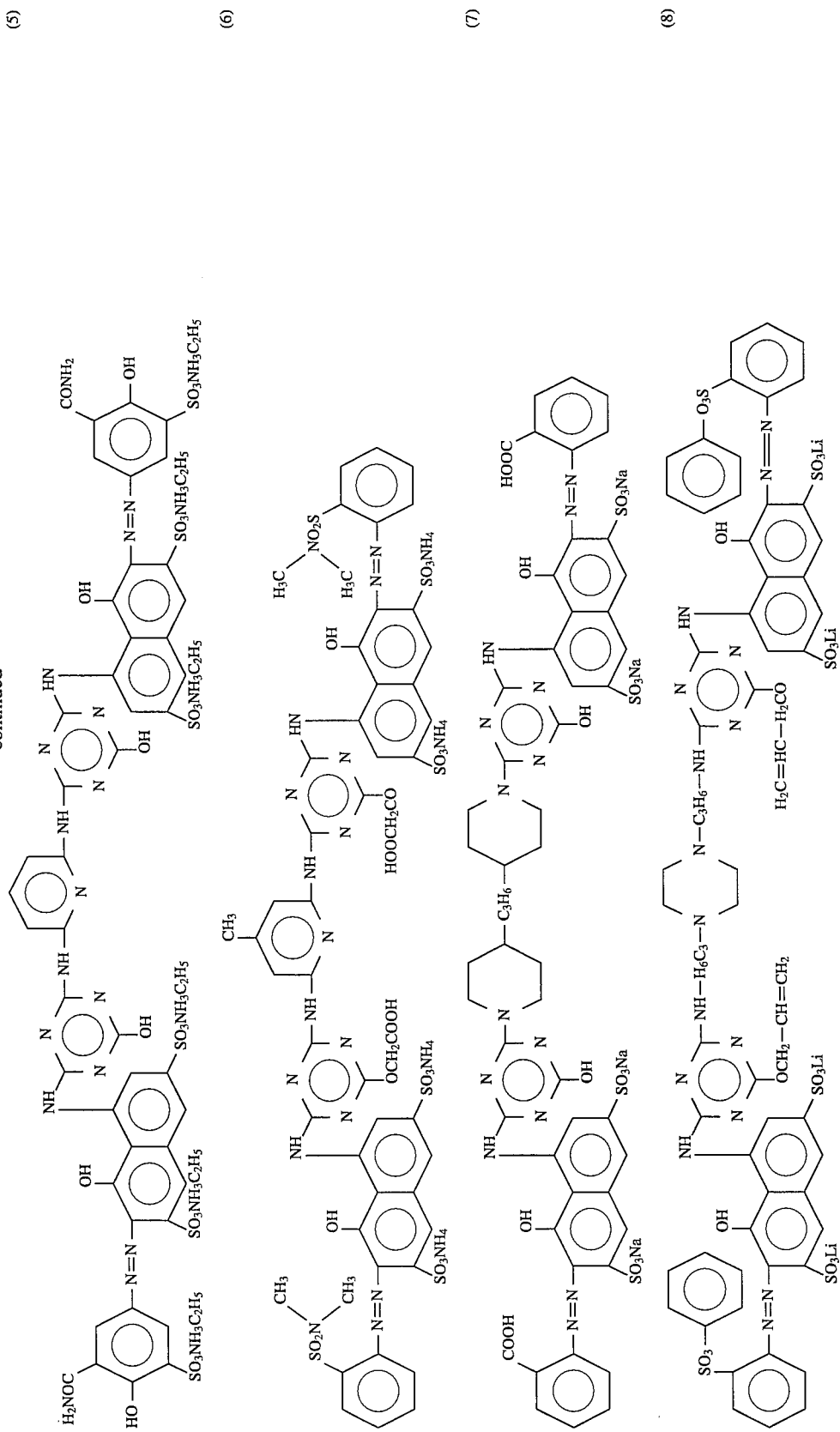

-continued
(9)
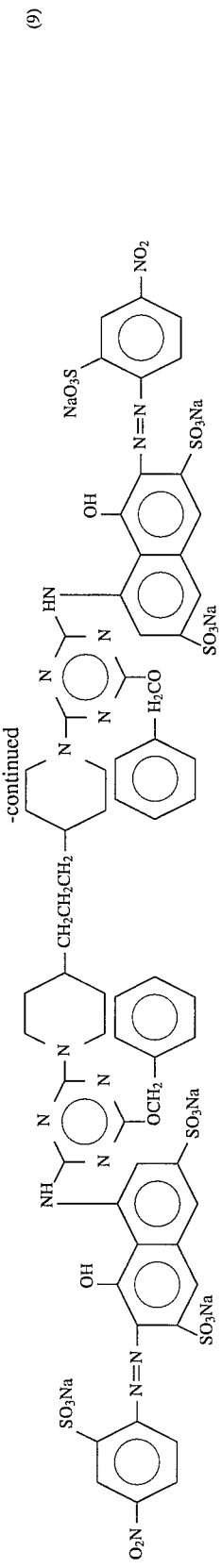
(10)
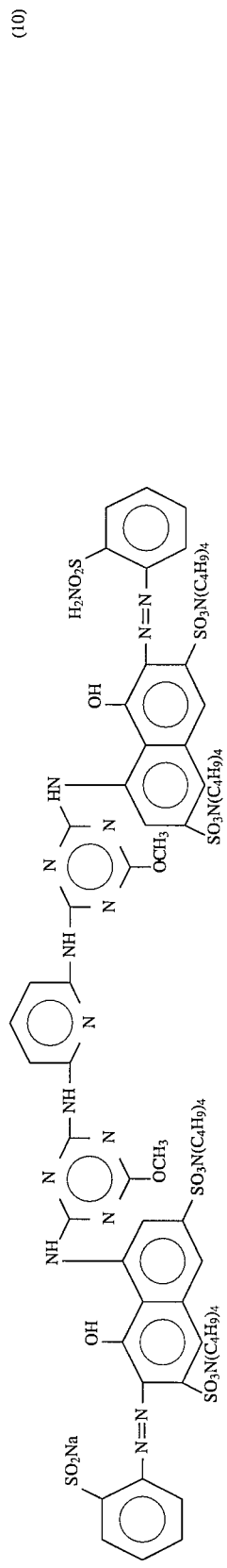
(11)
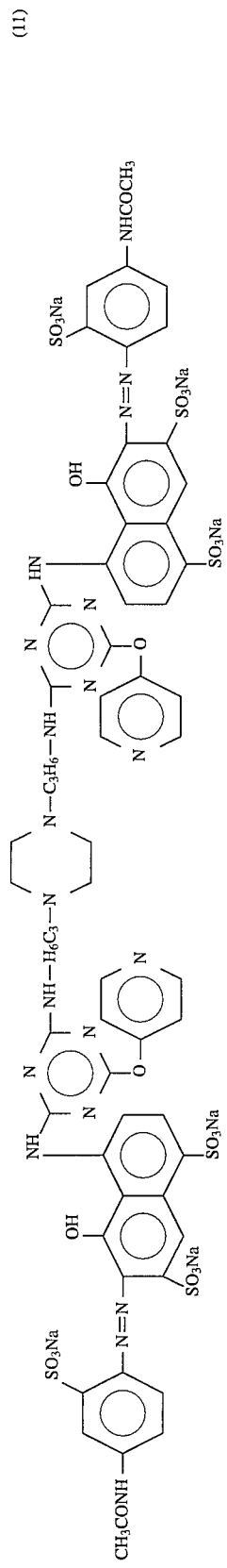
(12)
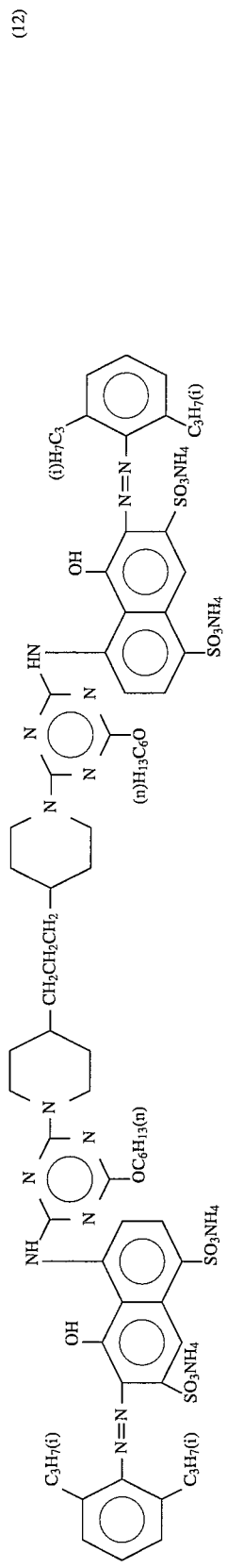

(13)
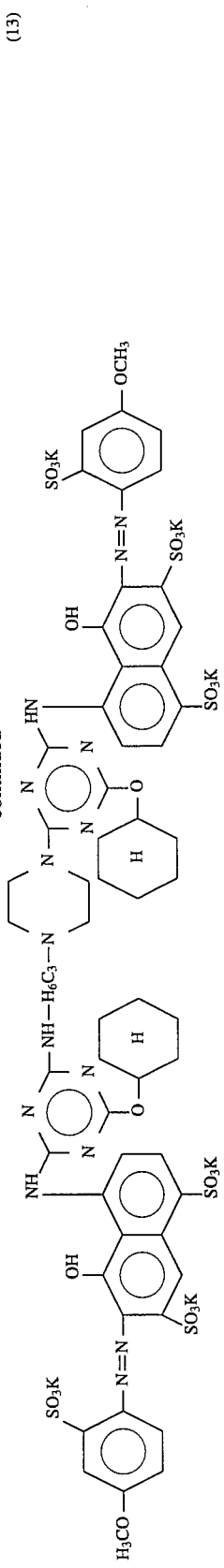
(14)
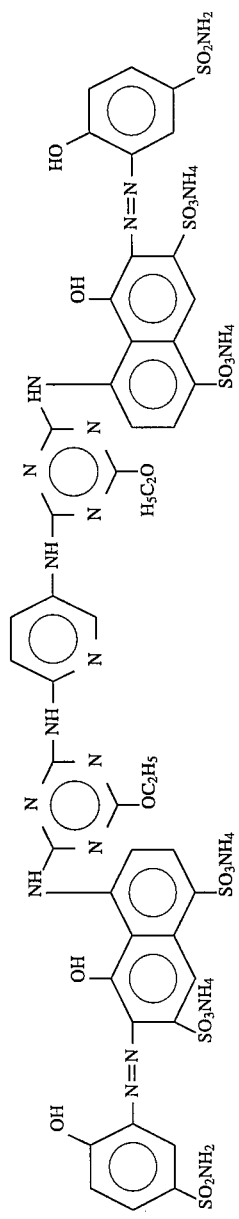
(15)
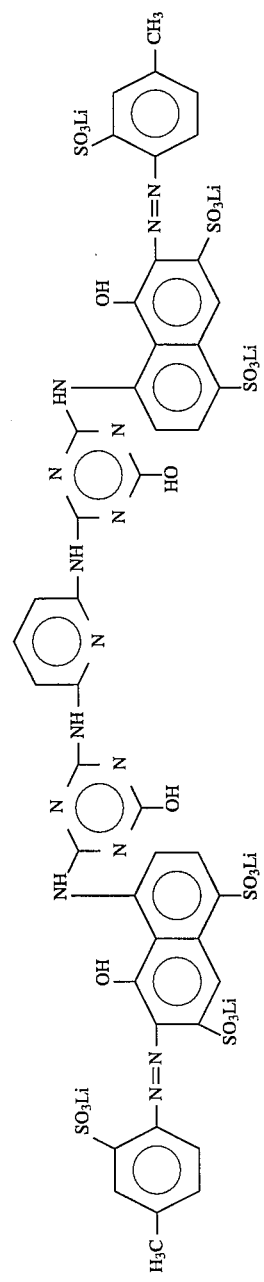
(16)
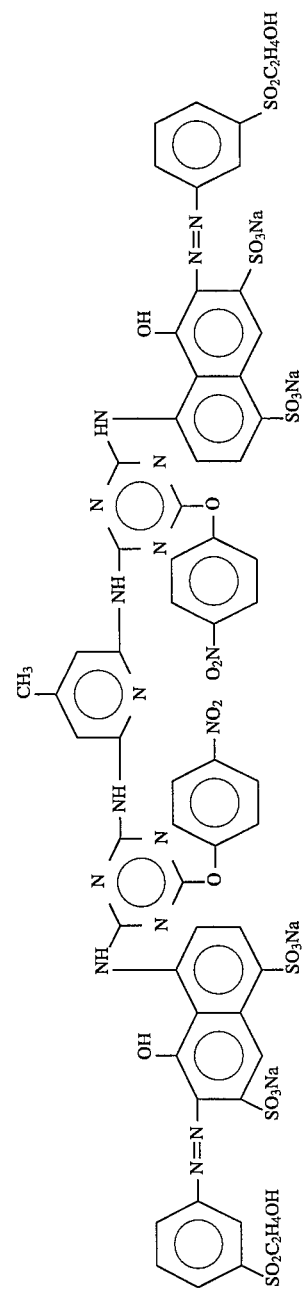

-continued
(17) 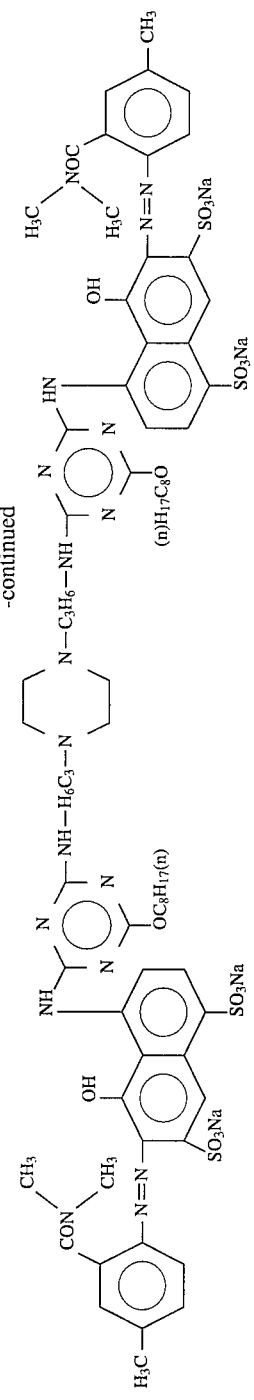
(18) 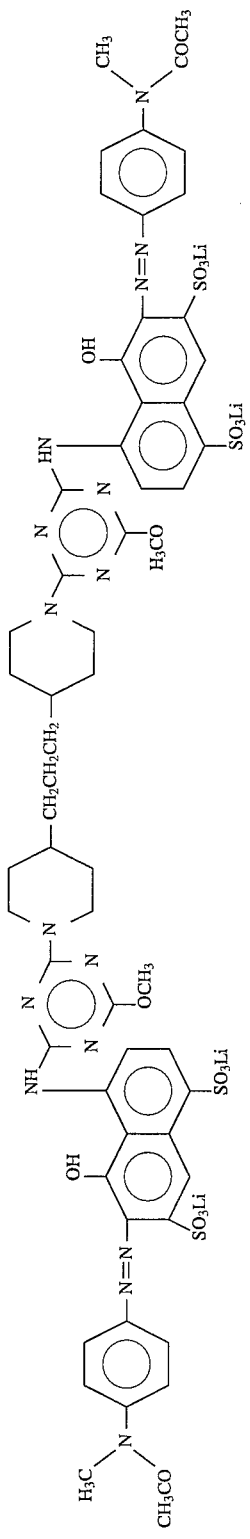
(19) 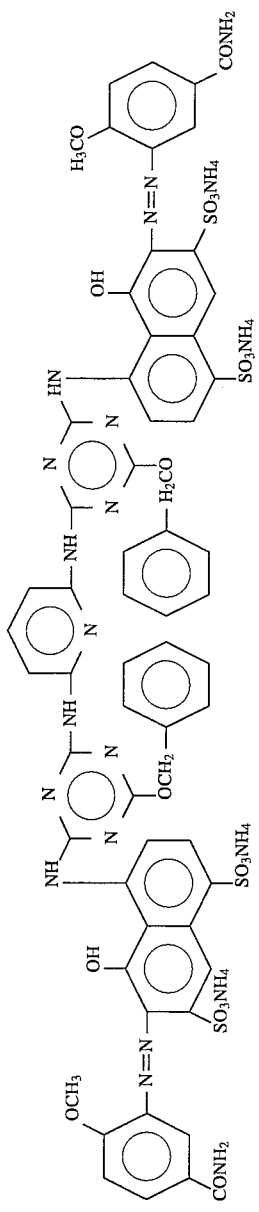
(20) 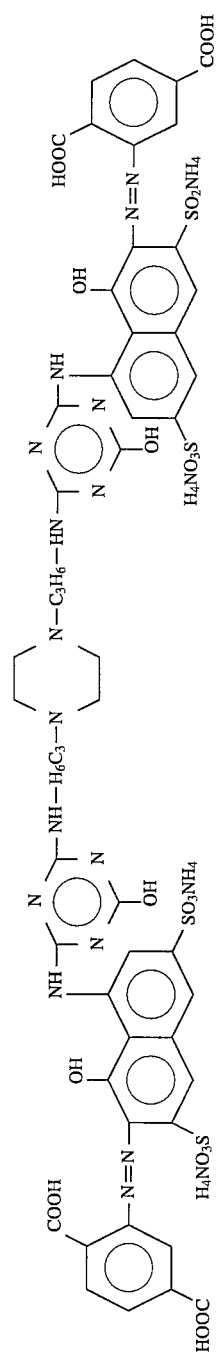

(21) 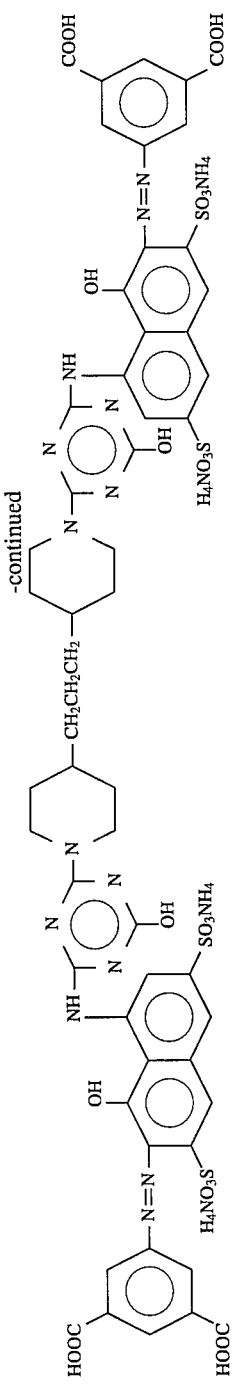
(22) 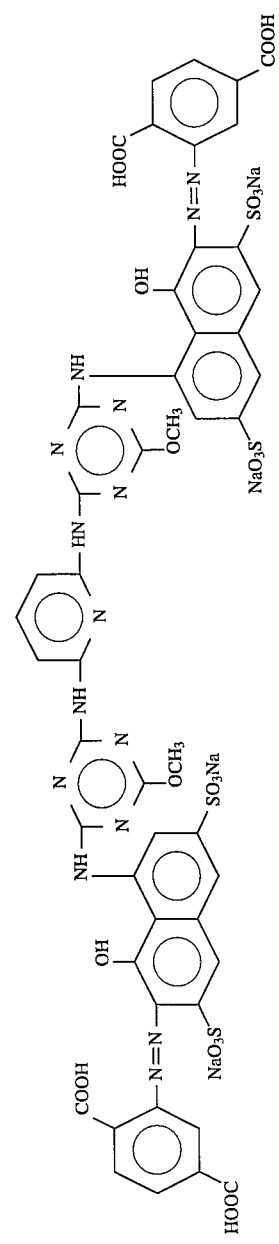
(23) 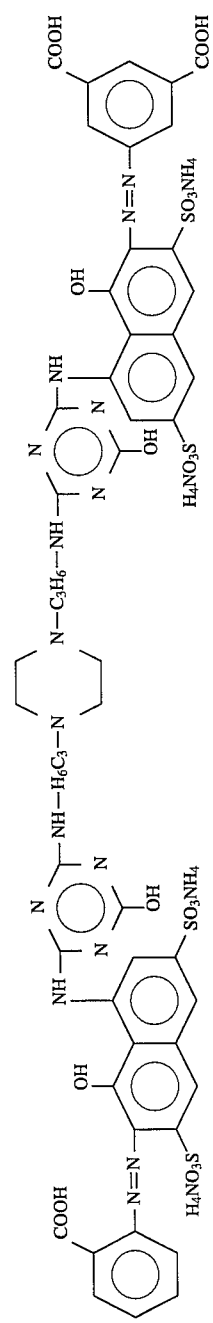
(24) 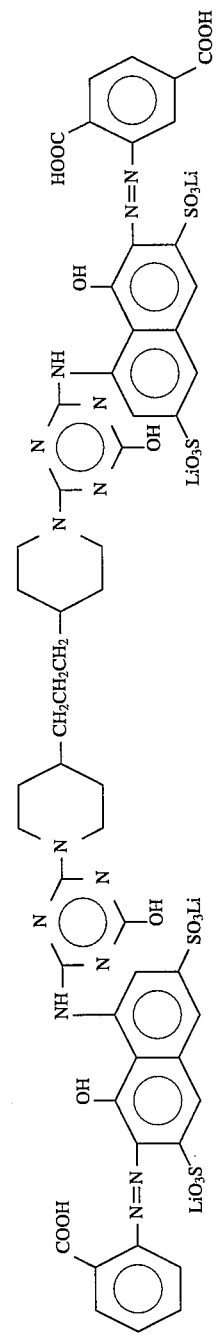

The dyes represented by formula (I) can be produced by any known methods.

For example, dye No. (1) can be produced through steps (A) and (B).

(A) A monoazo compound is produced from 2-aminobenzoic acid and 1-amino-8-hydroxy-3,6-naphthalenedisulfonic acid (H-acid) through diazotization and coupling according to a known method (as described, e.g., in *Shin Senryo Kagaku* (New Dye Chemistry) written by Yutaka Hosoda, published by Gihodo, Japan on Dec. 21, 1973, pp. 396–409).

(B) The monoazo compound obtained is added to a suspension of cyanuric chloride while maintaining a pH of 4 to 6 and a temperature of 0° to 5° C., and reaction is conducted for several hours. Subsequently, the reaction mixture is regulated so as to be weakly alkaline, and 1,4-bisaminopropylpiperazine is added thereto at room temperature in an amount of 0.5 mol per mol of the monoazo compound to conduct condensation reaction for several hours.

Thereto is then added 25% aqueous sodium hydroxide solution at 50° to 60° C. to perform hydrolysis reaction. The reaction mixture is cooled and subjected to salting-out with sodium chloride to obtain the desired dye.

In the recording liquid of the present invention, the dyes represented by formula (I) may be used either alone or in combination of two or more thereof which differ in substituent, or may be used in combination with another kind of dye.

For example, a recording liquid containing at least one dye selected from the following Group A of xanthene dyes in addition to any of the dyes represented by formula (I) is also preferably used.

Group A

C.I. AR-50, C.I. AR-51, C.I. AR-52, C.I. AR-87, C.I. AR-91, C.I. AR-92, C.I. AR-93, C.I. AR-94, C.I. -95, C.I. AR-98, C.I. AR-289, C.I. BR-1, and C.I. BV-10, wherein C.I. indicates Color Index, AR indicates Acid Red, BR indicates Basic Red, and BV indicates Basic Violet.

In the case where at least one dye selected from the dyes represented by formula (I) is thus used in combination with at least one dye selected from Group A of xanthene dyes, the proportion of the former to the latter dye is preferably from 1/9 to 9/1 by weight.

In the recording liquid of the present invention, the total content of all dyes comprising at least one dye selected from the dyes represented by formula (I) is preferably from 0.5 to 5% by weight, more preferably from 2 to 4% by weight, based on the total amount of the recording liquid.

A solvent for use as the aqueous medium in the present invention preferably comprises water and a water-soluble organic solvent. Examples of the water-soluble organic solvent include ethylene glycol, propylene glycol, butylene glycol, diethylene glycol, triethylene glycol, polyethylene glycol (weight-average molecular weight: about 190-400), glycerol, N-methylpyrrolidone, N-ethylpyrrolidone, 1,3-dimethylimidazolidinone, thiodiethanol, dimethyl sulfoxide, ethylene glycol monoallyl ether, ethylene glycol monomethyl ether, diethylene glycol monomethyl ether, 2-pyrrolidone, sulfolane, ethyl alcohol, and isopropanol. These water-soluble organic solvents are generally used in an amount of from 1 to 50% by weight based on the total amount of the recording liquid, while water is generally used in an amount of from 45 to 95% by weight based on the total amount of the recording liquid.

The property of quick drying after printing and print quality can be improved further by adding a compound selected from urea, thiourea, biuret, and semicarbazide to the recording liquid of the present invention in an amount of from 0.1 to 10% by weight, preferably from 0.5 to 5% by weight, based on the total amount of the recording liquid, or by adding a surfactant to the recording liquid in an amount of from 0.001 to 5.0% by weight based on the total amount of the recording liquid.

The recording liquid of the present invention is especially suitable for use in the ink-jet recording method in which the recording liquid is ejected as minute droplets and adhered to a receiving material to conduct recording. Techniques for ejecting the recording liquid as droplets are not particularly limited, and examples thereof include a technique in which electrical or thermal energy is used for droplet formation. The receiving material is not particularly limited, and examples thereof include plain paper, synthetic papers, and other materials, e.g., films and fabrics, which have undergone a surface treatment for facilitating recording-liquid fixation.

The present invention will be explained below in more detail by reference to Examples, but the invention should not be construed as being limited thereto as long as it is within the spirit thereof.

EXAMPLE 1

Water and 5% by weight of ammonia water were added to a mixture of 10 parts by weight of diethylene glycol, 3 parts by weight of isopropyl alcohol, and 3 parts by weight of dye No. (1) specified hereinabove in such amounts as to regulate the pH of a resulting composition to 9 and the total amount thereof to 100 parts by weight. The resulting composition was sufficiently mixed to dissolve the dye, filtered under pressure through a Teflon® filter having a pore diameter of 1 μm, and then degassed with a vacuum pump and an ultrasonic cleaning machine to prepare a recording liquid.

Using the recording liquid obtained, ink-jet recording was conducted on paper for electrophotography (manufactured by Xerox Co.) with an ink-jet printer (trade name HG-3000, manufactured by Epson Co.) to obtain a recorded image bearing characters of a clear (high-chroma) magenta color. The recorded image was evaluated according to the following methods (a), (b), and (c). The results obtained are shown therewith.

a) Light Resistance of Recorded Image

Using a xenon fademeter (manufactured by Suga Shikenki K. K., Japan), the recorded image was irradiated for 100 hours. As a result, the discoloration or fading caused by the irradiation was little.

(b) Water Resistance of Recorded Image (1) Test Method (i) The recorded image was immersed in tap water for 5 minutes and then visually examined for image blurring.

(ii) Before and after the immersion, the OD value of a solid print part of the recorded image was measured with a Macbeth densitometer (trade name TR927, manufactured by Macbeth Co.).

(2) Test Results

The image blurring in test (i) was slight.

The density change of the solid print part through immersion in test (ii) was 93.1% in terms of the percentage of residual OD (%), which was calculated using the equation given below.

$$\text{Residual } OD\ (\%) = \frac{OD \text{ Value after immersion}}{OD \text{ Value before immersion}} \times 100(\%)$$

(c) Storage Stability of the Recording Liquid

The recording liquid was placed in sealed Teflon® containers, and stored for 1 month at 5° C. and 60° C. Thereafter, the recording liquid was examined for any change. As a result, precipitation of an insoluble matter was not observed.

EXAMPLE 2

Water and aqueous lithium hydroxide solution were added to a mixture of 5 parts by weight glycerol, 10 parts by weight of ethylene glycol, and 2.5 parts by weight of dye No. (2) specified hereinabove in such amounts as to regulate the pH of the resulting composition to 9 and the total amount thereof to 100 parts by weight. The resulting composition was treated in the same manner as in Example 1 to prepare a recording liquid. The recording liquid was used to conduct printing in the same manner as in Example 1 to obtain a recorded image bearing characters of a clear (high-chroma) magenta color. The recorded image was evaluated for properties (a) to (c) given in Example 1. As a result, satisfactory results were obtained in all the evaluations as in Example 1. The residual OD was 82.1%.

EXAMPLES 3 AND 4

Recording liquids were prepared and subjected to printing in the same manner as in Example 1, except that 3 parts by weight of dye No. (20) or dye No. (24), each specified hereinabove, was used, respectively, in place of 3 parts by weight of dye No. (1). The recorded images were evaluated for properties (a) to (c) given in Example 1. As a result, satisfactory results were obtained as in Example 1. The residual OD were 90.1% and 92.2% for dye No. (20) and dye No. (24), respectively.

in Example 1. As a result, satisfactory results were obtained as in Example 1. The residual OD was 91.9%.

EXAMPLES 6 TO 24

Recording liquids were prepared and subjected to printing in the same manner as in Example 1, except that each of dyes Nos. (3) to (19), (21), (22) and (23), each specified hereinabove, was used in place of dye No. (1). The recorded images were evaluated for properties (a) to (c) given in Example 1. As a result, each image gave satisfactory results as in Example 1. The residual OD for dye No. (3) (Example 6) was 92.1%.

COMPARATIVE EXAMPLE 1

A recording liquid was prepared and subjected to printing in the same manner as in Example 1, except that dye (A) shown below was used in place of dye No. (1). The recorded image was evaluated for properties (a) to (c) given in Example 1.

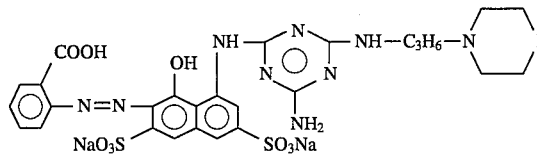
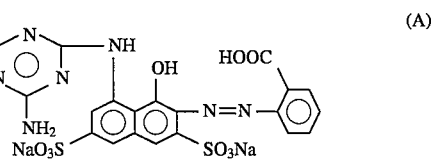

(A)

COMPARATIVE EXAMPLE 2

A recording liquid was prepared and subjected to printing in the same manner as in Example 1, except that dye (B) shown below, which is used in Example 2 of International Publication WO 94/16021, was used in place of dye No. (1). The recorded image was evaluated for properties (a) to (c) given in Example 1.

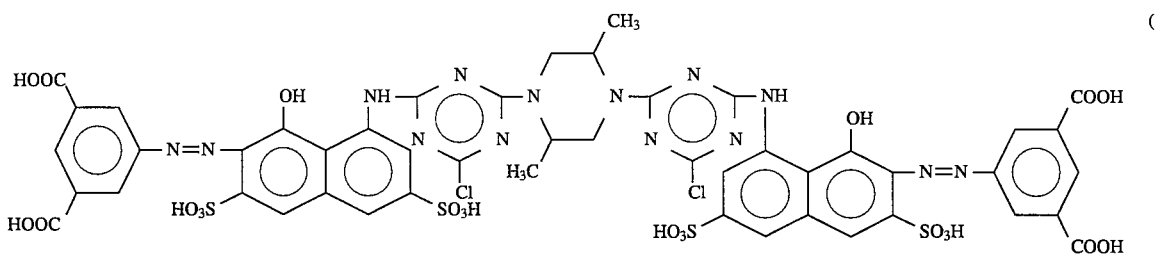
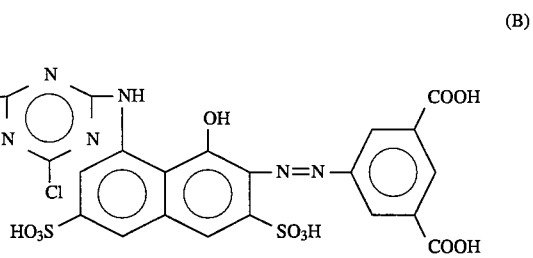

(B)

EXAMPLE 5

A recording liquid was prepared and subjected to printing in the same manner as in Example 1, except that a mixture of 1.5 parts by weight of dye No. (1) and 1.5 parts by weight of dye No. (20) was used in place of dye No. (1). The recorded image was evaluated for properties (a) to (c) given

COMPARATIVE EXAMPLE 3

A recording liquid was prepared and subjected to printing in the same manner as in Example 1, except that dye (C) shown below, which is the dye of the structure of Compound Example 5 given in JP-A-4-279671 wherein Z is an OH group, was used in place of dye No. (1). This print was evaluated for properties (a) to (c) given in Example 1.

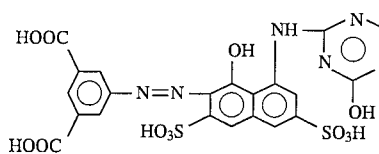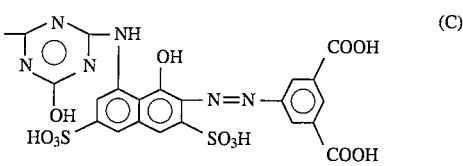 (C)

The results obtained in Examples 1 to 6 and Comparative Examples 1 to 3 are summarized in Table 1.

TABLE 1

| | Color tone (chroma) | Light resistance | Water resistance | | Storage stability |
| --- | --- | --- | --- | --- | --- |
| | | | Blurring | Residual OD (%) | |
| Example 1 | A | A | A | 93.1 | A |
| Example 2 | A | A | A | 82.1 | A |
| Example 3 | A | A | A | 90.1 | A |
| Example 4 | A | A | A | 92.2 | A |
| Example 5 | A | A | A | 91.9 | A |
| Example 6 | A | A | A | 92.1 | A |
| Comparative Example 1 | B | B | A | 94.5 | A |
| Comparative Example 2 | A | B | B | 66.4 | A |
| Comparative Example 3 | B | C | A | 84.0 | B |

Of the properties shown in Table 1, color tone was evaluated in terms of the chroma of the image. Specifically, the color tone was measured with a color difference meter (trade name SZ-Σ80, manufactured by Nippon Denshoku Kogyo K. K., Japan) based on the CIE 1976 (L*a*b*) color space to determine the values of L*, a*, and b*. Images for which the value of $$\sqrt{a^{*2}+b^{*2}},$$

which was calculated from a* and b*, was 60, or higher are indicated by A, images for which that value was 55 or higher but below 60 are indicated by B, and images for which that value was 55 or lower are indicated by C.

With respect to light resistance, A indicates that almost no discoloration or fading in image was visually observed; B indicates that slight discoloration or fading in image was visually observed; and C indicates that considerable discoloration or fading in image was observed and the image was not on a level suitable for practical use.

With respect to blurring as one measure of water resistance, A indicates that almost no or only slight blurring was visually observed in image outlines, and almost no decrease in image density was observed; B indicates that slight blurring in image outlines and a slight decrease in image density were observed; and C indicates that considerable blurring was observed and the original image outlines were difficult to recognize, and that the image was hence not on a level suitable for practical use.

Storage stability was evaluated by placing the stored recording liquid into a test tube and visually examining the recording liquid while holding the same to sunlight. Symbol A indicates that the recording liquid was completely free from any insoluble matter; B indicates that a small amount of insoluble matter was observed; and C indicates that the recording liquid contained a considerable amount of insoluble matter and was not on a level suitable for practical use.

EXAMPLE 25

Water and ammonia water were added to a mixture of 10 parts by weight of diethylene glycol, 5 parts by weight of N-methylpyrrolidone, 3 parts by weight of isopropyl alcohol, 3 parts by weight of dye No. (1) specified hereinabove, and 1.2 parts by weight of C.I. AR-289 in such amounts as to regulate the pH of a resulting composition to 9 and the total amount thereof to 100 parts by weight. The resulting composition was treated in the same manner as in Example 1 to prepare a recording liquid. The recording liquid was used to conduct printing in the same manner as in Example 1. The recorded image bore characters of a clearer magenta color than in Example 1. This print was evaluated for properties (a) to (c) given in Example 1. As a result, satisfactory results were obtained as in Example 1. The residual OD was 92.5%.

EXAMPLE 26

A recording liquid was prepared and subjected to printing in the same manner as in Example 1, except that a mixture of 2.5 parts by weight of dye No. (7) and 0.7 parts by weight of C.I. Bv-10 was used in place of 3 parts by weight of dye No. (1). The recorded image was evaluated for properties (a) to (c) given in Example 1. As a result, satisfactory results were obtained as in Example 25. The residual OD was 87.2%.

EXAMPLE 27

A recording liquid was prepared and subjected to printing in the same manner as in Example 1, except that a mixture of 1.5 parts by weight of dye No. (1), 1.5 parts by weight of dye (D) represented by the structural formula given below, and 1.5 parts by weight of C.I. BR-1 was used in place of 3 parts by weight of dye No. (1). The print obtained was evaluated for properties (a) to (c) given in Example 1. As a result, satisfactory results were obtained as in Example 25. The residual OD was 94.8%.

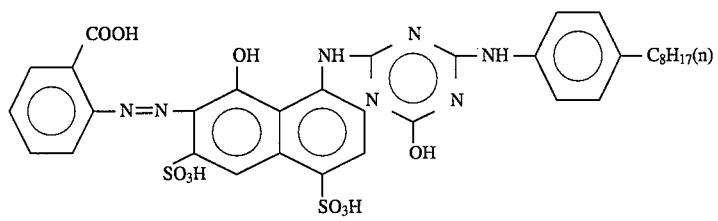

(D)

The results obtained in Examples 25 to 27 are summarized in Table 2.

TABLE 2

|  | Color tone (chroma) | Light resistance | Water resistance | | Storage stability |
|---|---|---|---|---|---|
|  |  |  | Blurring | Residual OD (%) |  |
| Example 25 | A | A | A | 92.5 | A |
| Example 26 | A | A | A | 87.2 | A |
| Example 27 | A | A | A | 94.8 | A |

The recording liquid of the present invention is used for ink-jet recording and in writing utensils and, when used in recording on plain paper, it can give a image bearing characters of a clear magenta color. These printed characters are excellent in color density, light resistance, and water resistance. In addition, the recording liquid has satisfactory storage stability.

While the invention has been described in detail and with reference to specific embodiments thereof, it will be apparent to one skilled in the art that various changes and modifications can be made therein without departing from the spirit and scope thereof.

What is claimed is:

1. A recording liquid comprising an aqueous medium and at least one dye selected from dyes, the free acid forms of which are represented by formula (I):

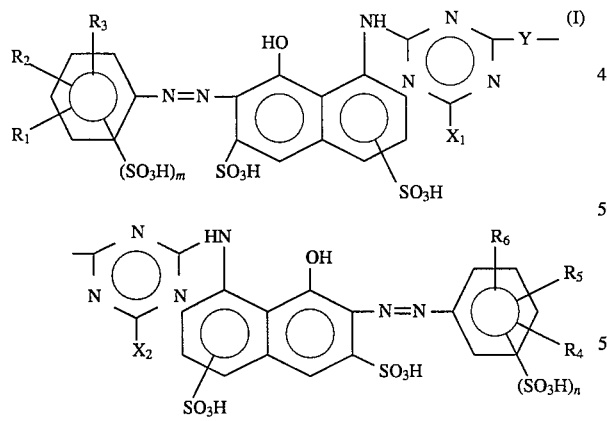

wherein $R_1$, $R_2$, $R_3$, $R_4$, $R_5$, and $R_6$ each independently represents a substituted or unsubstituted alkyl group having 1 to 9 carbon atoms, an alkoxy group having 1 to 9 carbon atoms, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic ester group, a sulfonyl group, a carboxyl group, or a carboxylic ester group;

m and n each independently represents a number of 0, 1, or 2;

$X_1$ and $X_2$ each independently represents a group represented by $-OR_7$;

$R_7$ represents a hydrogen atom, an alkyl group having 1 to 8 carbon atoms, an alkenyl group having 2 or 3 carbon atoms, an aryl group, an aralkyl group, a cyclohexyl group, or a nitrogenous heterocyclic group, these groups each optionally having a substituent; and Y represents a divalent connecting group represented by any one of formulae (II) to (V):

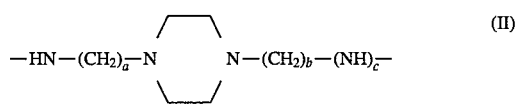

wherein a and b each represents a number of 0 to 6 and c represents a number of 0 or 1,

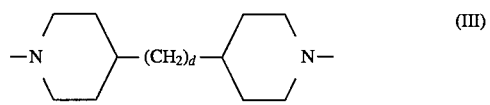

wherein d represents a number of 1 to 6,

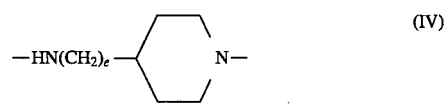

wherein e represents a number of 1 to 6,

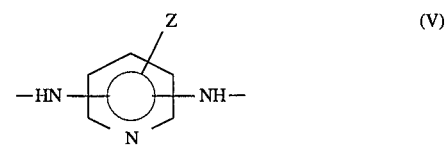

wherein Z represents a hydrogen atom or an alkyl group having 1 to 4 carbon atoms.

2. A recording liquid as claimed in claim 1, wherein said at least one dye has a structure represented by formula (I) wherein the number of carboxyl groups is not more than 3.

3. A recording liquid as claimed in claim 1, wherein said at least one dye has a structure represented by formula (I) wherein m and n each is 1 and each SO₃H group is bonded to the phenyl group at the ortho position with respect to the azo group.

4. A recording liquid as claimed in claim 1, wherein said at least one dye has a structure represented by formula (I) wherein m and n each is 0; at least one of $R_1$ to $R_3$ and at least one of $R_4$ to $R_6$ each is a hydrogen atom; and at least one of $R_1$ to $R_3$ and at least one of $R_4$ to $R_6$ each is a group selected from the group consisting of a trifluoromethyl group, a substituted or unsubstituted sulfamoyl group, a group derived from a lower alkyl ester of a sulfonic acid, a group derived from a $C_{6-12}$ aryl ester of a sulfonic acid, a COOH group, and a group derived from a lower alkyl ester of a carboxylic acid, each of these groups being bonded to the phenyl group at the ortho position with respect to the azo group.

5. A recording liquid as claimed in claim 1, wherein said at least one dye has a structure represented by formula (I) wherein the moieties

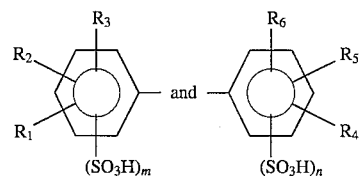

are

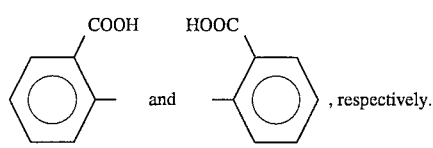

, respectively.

6. A recording liquid as claimed in claim 1, wherein said at least one dye has a structure represented by formula (I) wherein $X_1$ and $X_2$ each represents an OH group.

7. A recording liquid as claimed in claim 1, wherein said at least one dye has a structure represented by formula (I) wherein the moieties

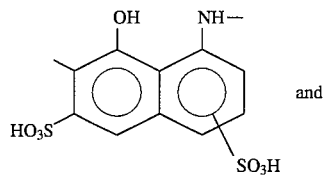

are

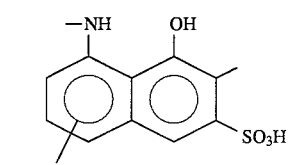

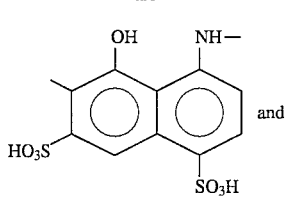

, respectively.

8. A recording liquid as claimed in claim 1, wherein said at least one dye has a structure represented by formula (I) wherein the moieties

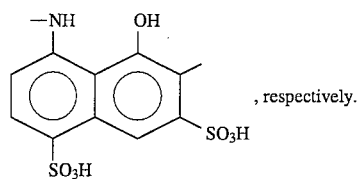

and

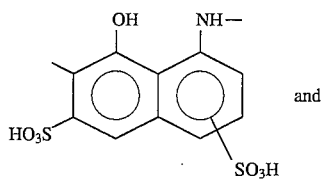

are

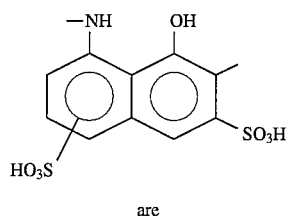

and

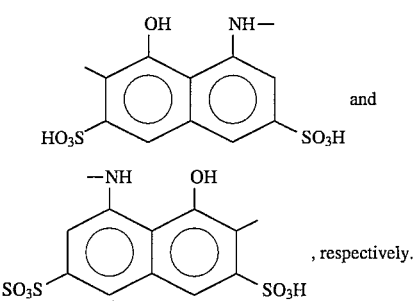

, respectively.

9. A recording liquid as claimed in claim 1, said recording liquid further comprises at least one xanthene dye selected from the group consisting of C.I. AR-50, C.I. AR-51, C.I. AR-52, C.I. AR-87, C.I. AR-91, C.I. AR-92, C.I. AR-93, C.I. AR-94, C.I. AR-95, C.I. AR-98, C.I. AR-289, C.I. BR-1, and C.I. BV-10, wherein C.I. indicates Color Index, AR indicates Acid Red, BR indicates Basic Red, and BV indicates Basic Violet.

10. A recording liquid as claimed in claim 9, wherein the proportion of said at least one dye selected from dyes, the free acid forms of which are represented by formula (I) to said at least one xanthene dye is from 1/9 to 9/1 by weight.

11. A recording liquid as claimed in claim 1, wherein the total content of all dyes comprising said at least one dye selected from dyes, the free acid forms of which are represented by formula (I), is from 0.5 to 5% by weight based on the total amount of said recording liquid.

12. An ink-jet recording method comprising the step of adhering droplets of a recording liquid, which are issued from minute ejection orifices, to a receiving material to record an image on said receiving material, said recording liquid comprising an aqueous medium and at least one dye selected from dyes, the free acid forms of which are represented by formula (I):

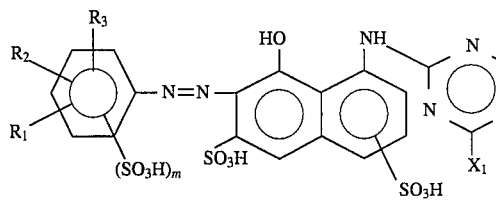

wherein $R_1$, $R_2$, $R_3$, $R_4$, $R_5$, and $R_6$ each independently represents a substituted or unsubstituted alkyl group having 1 to 9 carbon atoms, an alkoxy group having 1 to 9 carbon atoms, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic ester group, a sulfonyl group, a carboxyl group, or a carboxylic ester group;

m and n each independently represents a number of 0, 1, or 2;

$X_1$ and $X_2$ each independently represents a group represented by —$OR_7$;

$R_7$ represents a hydrogen atom, an alkyl group having 1 to 8 carbon atoms, an alkenyl group having 2 or 3 carbon atoms, an aryl group, an aralkyl group, a cyclohexyl group, or a nitrogenous heterocyclic group, these groups each optionally having a substituent; and Y represents a divalent connecting group represented by any one of formulae (II) to (V):

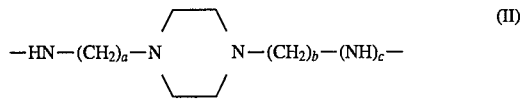

wherein a and b each represents a number of 0 to 6 and c represents a number of 0 or 1,

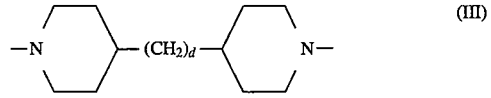

wherein d represents a number of 1 to 6,

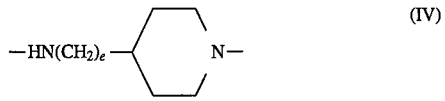

wherein e represents a number of 1 to 6,

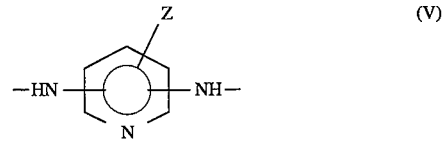

wherein Z represents a hydrogen atom or an alkyl group having 1 to 4 carbon atoms.

* * * * *